US007007842B2

(12) United States Patent
Hawkins et al.

(10) Patent No.: US 7,007,842 B2
(45) Date of Patent: Mar. 7, 2006

(54) METHOD AND APPARATUS FOR INK-BASED ELECTRONIC VOTING

(76) Inventors: Richard Hawkins, 11535 Rochester Ave., Apt 405, Los Angeles, CA (US) 90025; Ping Shao, 757 Ocean Ave., Rm 114, Santa Monica, CA (US) 90402

(*) Notice: Subject to any disclaimer, the term of this patent is extended or adjusted under 35 U.S.C. 154(b) by 0 days.

(21) Appl. No.: 10/983,466

(22) Filed: Nov. 8, 2004

(65) Prior Publication Data

US 2006/0011722 A1 Jan. 19, 2006

Related U.S. Application Data

(60) Provisional application No. 60/589,182, filed on Jul. 19, 2004.

(51) Int. Cl.
*G06F 17/60* (2006.01)

(52) U.S. Cl. ........................................ 235/386; 235/51

(58) Field of Classification Search ................ 235/386, 235/51, 92; 705/12

See application file for complete search history.

(56) References Cited

U.S. PATENT DOCUMENTS

| | | | | |
|---|---|---|---|---|
| 3,944,788 A * | 3/1976 | Comisar et al. | .......... | 235/54 F |
| 4,315,267 A * | 2/1982 | Sonoda et al. | ............ | 346/74.2 |
| 4,649,264 A | 3/1987 | Carson | | |
| 5,206,486 A | 4/1993 | Stephens et al. | | |
| 5,278,753 A | 1/1994 | Graft, III | | |
| 5,583,329 A | 12/1996 | Davis, III et al. | | |
| 5,585,612 A * | 12/1996 | Harp, Jr. | ...................... | 235/51 |
| 5,635,726 A | 6/1997 | Zavislan | | |
| 5,758,325 A | 5/1998 | Lohry et al. | | |
| 6,550,675 B1 * | 4/2003 | Davis et al. | ................ | 235/386 |
| 6,606,087 B1 * | 8/2003 | Tomomatsu | ................ | 345/174 |
| 6,688,517 B1 | 2/2004 | McClure et al. | | |
| 6,731,775 B1 | 5/2004 | Ancin | | |
| 6,823,075 B1 | 11/2004 | Perry | | |
| 6,951,303 B1 * | 10/2005 | Petersen et al. | ............ | 235/386 |
| 2002/0066780 A1 * | 6/2002 | Balolia | ........................ | 235/51 |
| 2002/0092908 A1 * | 7/2002 | Chumbley | .................. | 235/386 |
| 2004/0027809 A1 * | 2/2004 | Takahashi et al.l | ......... | 361/737 |

* cited by examiner

Primary Examiner—Thien M. Le
Assistant Examiner—Kimberly D. Nguyen
(74) *Attorney, Agent, or Firm*—David H. Chan

(57) ABSTRACT

The present invention is an ink-based electronic voting apparatus that generates a paper ballot for every voter. The voter marks a ballot with a probe as he/she would with a conventional ink-based system. In one embodiment, the paper ballot is situated underneath the surface of an input board electrically connected to a computer. A vote is cast when the probe is depressed onto the ballot at a designated input point. The electrical interaction between the probe and the input board generates a vote signal for recording and causes ink to be released from the probe to mark a corresponding spot on the paper ballot. As such, votes are electronically recorded for fast tabulation while paper ballots are generated for manual and/or optical scanner recounts to safeguard against computer errors and tampering. Furthermore the voting apparatus has a build-in mechanism to prevent undervoting and overvoting and thus increases valid votes.

33 Claims, 6 Drawing Sheets

METHOD AND APPARATUS FOR INK-BASED ELECTRONIC VOTING

This patent application claims priority to U.S. Provisional Patent Application No. 60/589,182, filed Jul. 19, 2004.

BACKGROUND OF THE INVENTION

1. Field of the Invention

The present invention relates to a method and apparatus for ink-based electronic voting.

2. Discussion of Related Art

Various types of voting machines are known in the art. Driven by a desire for efficient vote counting, there has been a gradual migration in recent years from mechanical systems such as punch cards to electronic systems such as touch-screen computers. Despite promises of higher accuracy than mechanical systems, electronic systems are prone to tampering and many in the public are skeptical about their reliability. Thus, in many localities electronic voting machines are beginning to be subjected to strict regulations. In particular, many localities require backup paper records and safety measures to prevent tampering. Other localities are simply delaying adoption of electronic systems because of concern that they present an unfamiliar interface to voters and cause an increase in voting error and voter frustration.

Hence what is needed is an electronic voting apparatus that generates adequate paper-based records and provides a familiar interface to voters.

SUMMARY OF THE INVENTION

The present invention is an ink-based electronic voting apparatus that generates a conventional ink-marked paper ballot for every voter. The voting apparatus presents a familiar interface to voters who have used an ink-based voting system. Instead of a pen, the present invention provides an electronic probe to the voter for marking the ballot. The voter marks the ballot with the probe as he/she would with a conventional ink-based system. The advantage here is that the probe has mechanism for electronically recording votes and mechanism for regulated ink-release to prevent mistakes.

To enhance accuracy, the voting apparatus of the present invention displays choices on a display screen and allows voter to use the probe to make selection on a paper ballot situated underneath the surface of an input board electrically connected to a computer. A vote is cast when a user depresses the probe on the ballot at a designated input point. The electronic interaction between the probe and the input board generates a vote signal for recording and causes ink to be released from inside the probe to mark a designated corresponding spot on the paper ballot card. As such, votes are electronically recorded for fast tabulation while actual paper ballots are generated for possible manual recounts and/or optical scanner recounts to safeguard against computer errors and tampering. Furthermore the voting apparatus has a built-in mechanism to prevent undervoting and overvoting and thus improve the number of valid votes actually recorded. For example, if the voter attempts to overvote (vote again for the same selection), the probe will be blocked from releasing ink and no vote will be recorded.

In one embodiment of the invention, the voting apparatus comprises of a main computing unit, an election box unit, and an electronic probe. The election box unit in one embodiment further comprises an IC reader/writer and a backup battery. The vote results are recorded on an IC card within the IC reader/writer. In one embodiment, a lock is placed on the IC reader/writer to prevent tampering. The main computing unit in one embodiment comprises a screen display for displaying voter choices during voting. In another embodiment, the voting apparatus also contains a voice card so the selections are announced to the voter via an earpiece. In other embodiments, the display and battery and IC reader maybe interchanged between the main computing unit and election box unit.

One aspect of the present invention is that it allows the voter to record ink marks on a paper ballot situated just below the surface of an input board (polling board) adapted to receive electrical signals. In one embodiment, the ballot is inserted into a slot so that the ballot sits between a top surface and a bottom surface of the input board.

The top surface of the input board has a grid of input points that line up with the printed selection points of the paper ballot. The input points are circular holes adapted to receive the head of the electronic probe. They are in alignment with the printed circles on the paper ballot underneath. A vote is registered when the probe is depressed into a valid input point, one that does not corresponds to an overvote or an invalid vote. The input points are electrically connected to the computer system. In one embodiment, election information leaflets are affixed onto the input board so that only one column of input points is visible to the voter. The leaflets contain arrows and numbers to identify the input points in the visible column. In one embodiment, the names of the candidates (or other election items) are printed on the leaflets. This is an arrangement found in many conventional voting systems. In another embodiment, the list of names are displayed on screen are numbered and correspond to the arrows and numbers on the leaflets affixed to the input boards. The voter flips to another leaflet to vote on the next column when voting is finished for the current column.

When the electronic probe head is inserted into an input point and creates electrical contact, the voting apparatus automatically provides voting information on the LCD screen and/or by voice. Thus for example, a voter can insert the probe into a first input point and see candidate 1's name displayed on screen and/or announced via the earpiece. Then the voter can move the probe and insert it into a second input point below to see candidate 2's name displayed on screen and/or announced and so on. The voter is both visually and audibly alerted to the choice he/she is about to make.

Before casting the actual vote, a voter can use the probe to go through the various input points in a column and see the candidate names displayed on screen. Because the ballot pages make the choices immediately apparent to a voter, he/she is not required to use the probe to cycle through all the input points to see the choices on the screen. However, in the case of a blind voter, the option of cycling through the input points provide a means of informing the voter audibly via an ear-piece as the voter traces down the predictable pattern of input points.

In another embodiment, each input point on the input board is equipped with an optical sensor that detects the presence of a probe head. Thus, actual contact is not required and the presence of the probe head at the input point would trigger the display and announcement of the candidate information.

After understanding the choices, a voter can cast his/her vote by fully depressing the probe into the input point corresponding to the desired choice. At full depression, the probe both generates electrical signals suitable for computerized vote tabulation and releases ink to mark the paper ballot card at the point underneath the input point. In one embodiment, circles are printed on the ballot card to match the holes of the input points, so that ink released by the probe at the input point will properly mark a circle on the ballot card. The probe in designed to prevent overvotes by withholding ink in an attempt to overvote. Also, if the voter moves on without voting on an item, one embodiment of the apparatus will warn the voter and block him or her from continuing until the voter registers an intention to move on without voting on the current item. This mechanism prevents unintentional undervotes.

The voting apparatus of the present invention is uniquely equipped to meet legal requirements that demand computerized systems generate paper records of the actual votes. Since each voter generates a conventional ink-based ballot, the ballots collected for the entire election can be recounted by manual or optical scanner means. Besides meeting this requirement, the present invention also offers a voting interface that is similar to the ink-based systems familiar to most voters and polling workers and thus reduces error and frustration.

A number of optional configurations can be made in the present invention. For example, an optional printer can be attached to provide a paper version of the vote results for an additional cross-check to ensure an even higher degree of accuracy and tamper-resistance. For enhanced accessibility, a keypad can be used as a voting input device in lieu of or in conjunction with the probe and input board.

The voting apparatus of the present invention also comprises of media drives to accommodate programming of election materials. A recording media (i.e. CD or DVD) can be programmed at the election headquarters with the requisite election information such as candidate lists. For example, the candidate information displayed on the screen (e.g. names, pictures, etc) is programmed onto the recording media. Then the media is inserted into the voting apparatus and the apparatus is locked before it is sent to the local polling stations.

In addition, the present invention comprises a language selection mechanism to allow voting to be conducted in multiple languages. For example, the recording media can be programmed to contain lists of candidates in Spanish so that the information is displayed and announced in the Spanish language during the voting process. Multiple languages can be recorded and a selection mechanism allows the voter to choose the language at the time of voting.

In an alternate embodiment, the invention comprises of an input board adapted to detect input of a normal pen. No probe is required in this embodiment. Instead, the input points on the input board contain sensors to detect the presence of the pen and record the votes cast. The user can mark the ballot on the input board and the voting apparatus will electronically record the votes. If a user attempts an overvote, the apparatus will display visual and audible warning. Any overvote will be blocked from being registered electronically by the programming. The overvote will be recorded so that it can be deducted from the vote total, ensuring the electronic vote and the ballot card vote remain equal.

Finally, an embodiment of the present invention allows for manual override in case of power or system failure. In such a case, the voter can use a regular pen to mark a ballot inserted into the input board in the same manner as one used in a regular ink-based system.

BRIEF DESCRIPTION OF THE DRAWINGS

These and other features, aspects and advantages of the present invention will become better understood with regard to the following description, appended claims and accompanying drawings where:

DETAILED DESCRIPTION ON THE INVENTION

Figure 1:
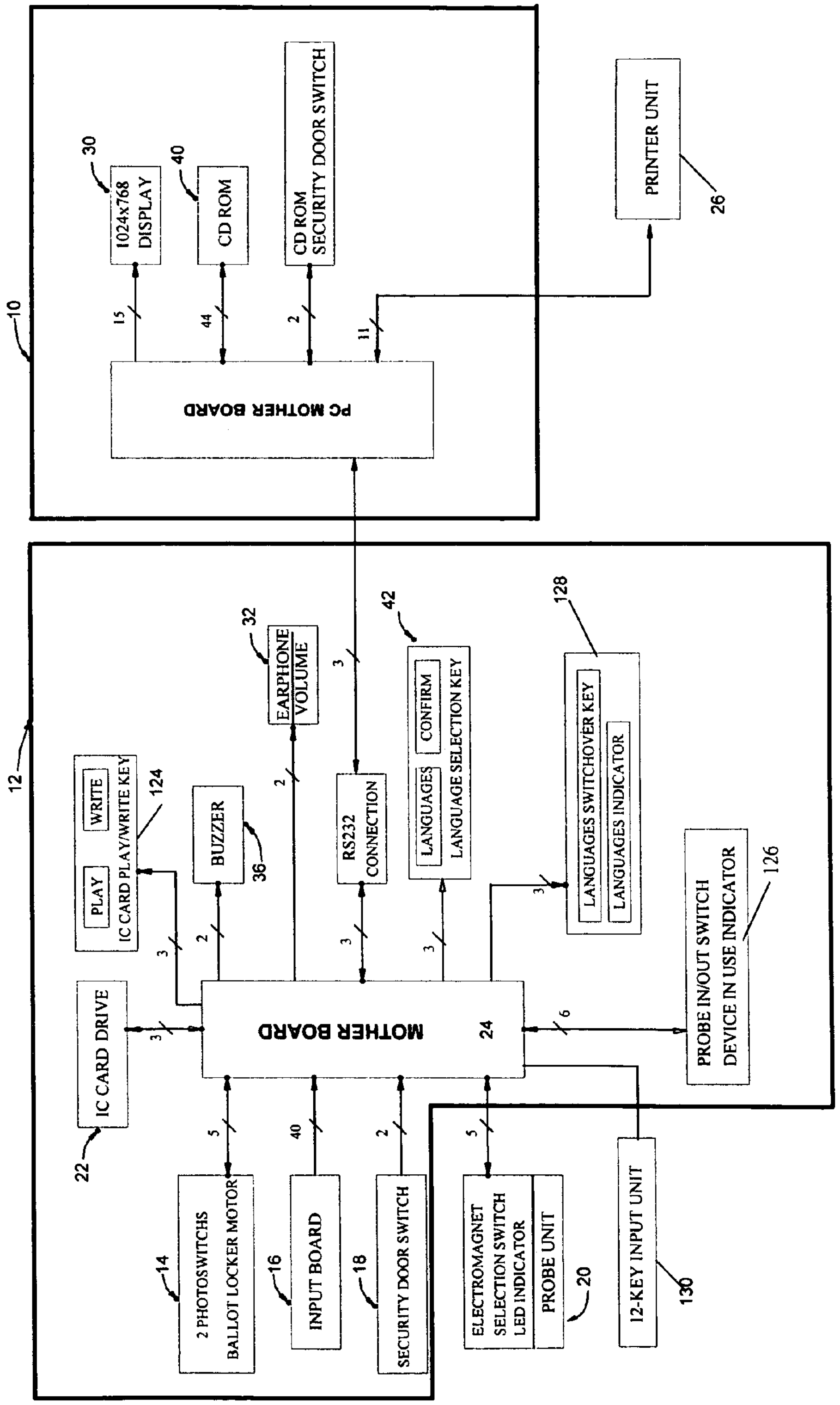
FIG. 1 is a block diagram overview of the present invention

FIG. 1 is a block diagram that illustrates an embodiment of the present invention. Main computing unit 10 is connected via a R232 connection or equivalent connection to election box unit 12. Election box unit 12 includes ballot locking mechanism 14, input board 16, and security door switch 18. Security door switch 18 locks IC card drive 22 and all connector jacks to prevent tampering when the apparatus is en route to and from the polling stations. Electronic probe unit 20 is operationally connected to election box unit 12. In one embodiment, probe unit 20 is connected to Single Board Computer (SBC) 24. In another embodiment, the probe unit is not needed. IC card drive 22 is also operationally connected to SBC 24 of election box unit 12. IC card drive 22 records the vote results onto an inserted IC card in the drive. IC card play/write key 124 is used to prevent unauthorized reading and writing of IC card and CD-ROM in CD-ROM 40. Authorized poll workers can use the key to initiate reading and writing the IC card and CD-ROM during the normal course of the operation of the apparatus. Finally, an optional key input unit 130 can be used to input votes via a keypad.

Figure 3:
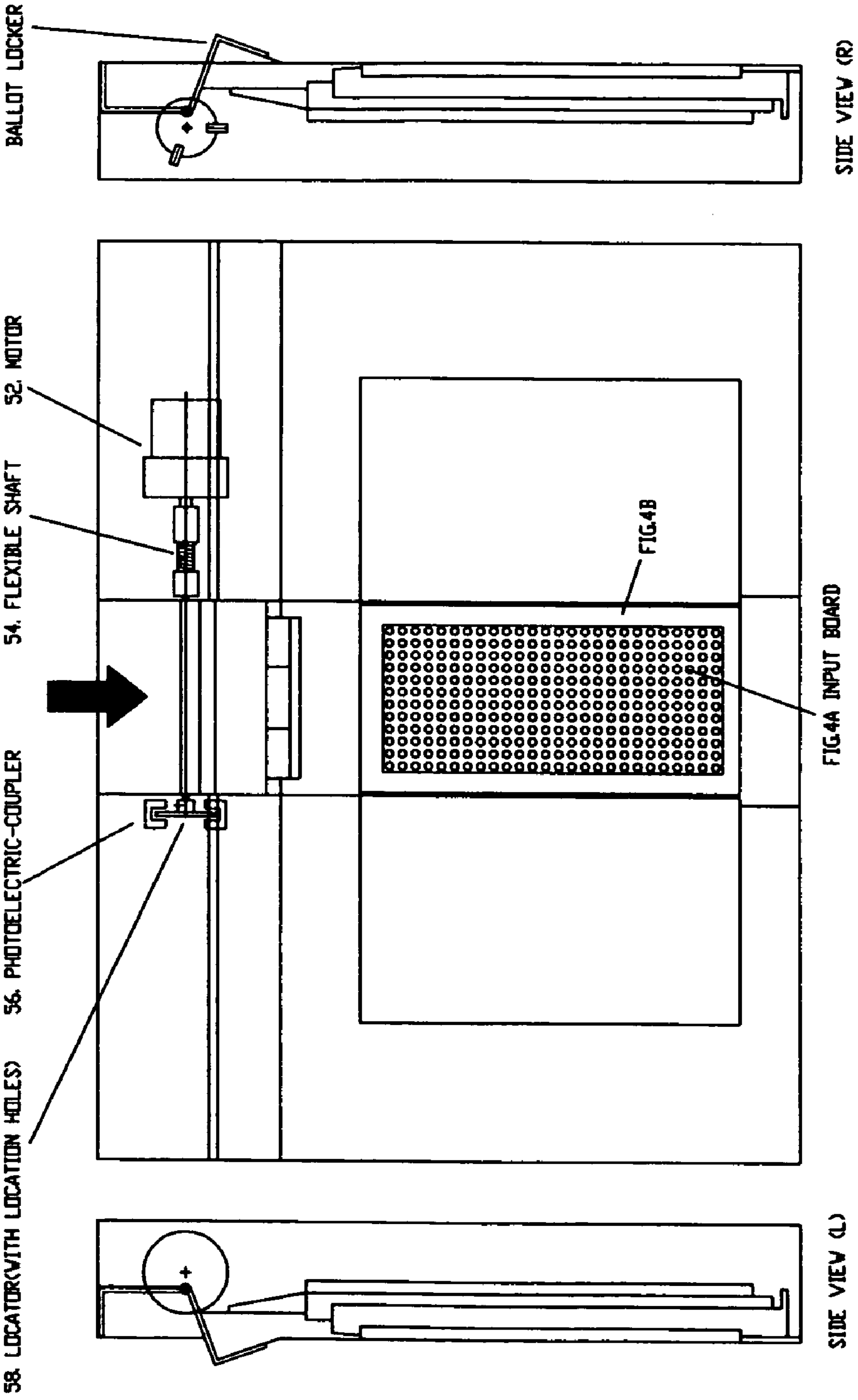
FIG. 3 is a diagram showing the motorized ballot lock and input board of the present invention.

In one embodiment of the present invention, the ballot card (or ballot) is secured into input board 16 of election box 12. Input board 16 has a slot on top adapted for the insertion of the paper ballot card. Once inserted, the ballot card sits underneath the input board surface and the printed circles on the ballot card are aligned with the circular input points (holes) on the top surface of the input board. One embodiment of the ballot securing means is shown in FIG. 3. The solid arrow in the top center of FIG. 3 shows where a ballot should be inserted into input board 16. During voting, a ballot (not shown) is secured into input board 16 by a locking mechanism. Motor 52, along with flexible shaft 54 and photoelectric-couplers 56, secure a ballot cover (not shown in the top view) that closes the slot and holds the ballot in place. The right and left side views of FIG. 3 show the ballot cover. In one embodiment, a motor and two photoelectric-couplers are connected to and controlled by CPU on SBC 24. When the ballot card is first placed into the ballot locker device, the cover is in the open position. When the probe is removed from its holder, motor 52 is activated to close the cover, locking the ballot. Photoswitch 126 (FIG. 1) is used to detect when the probe is removed from its holder. When the voter finalizes his/her votes and replaces the probe in its holder, photoswitch 126 is triggered so that the motor is reactivated and the lock is released. At this point, the ballot card can be removed. This prevents the ballot card from being prematurely removed before a voter completes the voting process. The lock also prevents tampering during the voting process.

Figure 2:
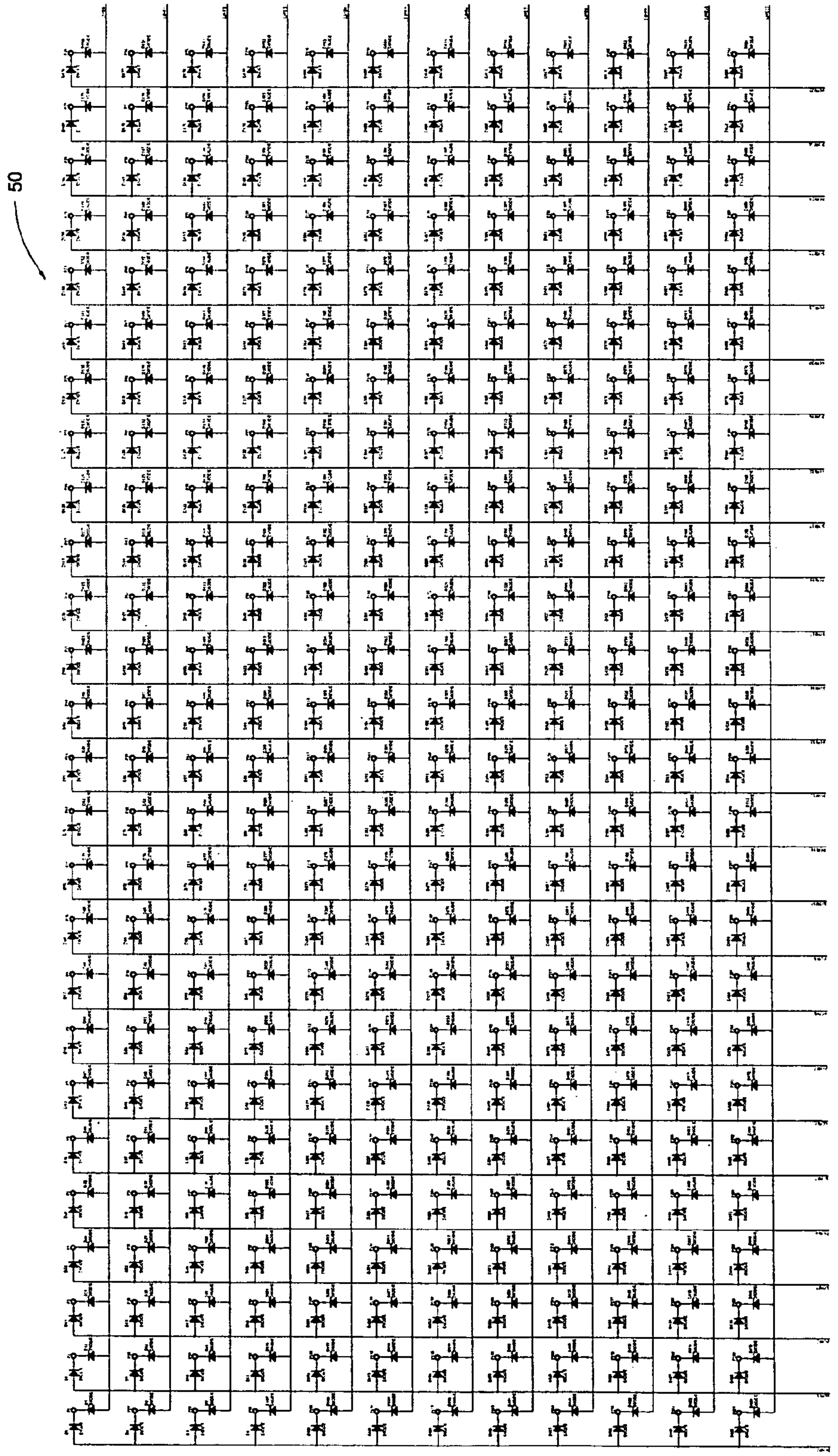
FIG. 2 is a schematic diagram of the input board according to an embodiment of the present invention.
Figure 2:
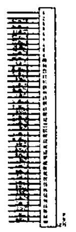

After the ballot is secured into the input board, the voter uses electronic probe 20 to begin marking the ballot in one embodiment. In one embodiment, polling box 16 comprises rectangular grid 50, which has a number of input points, as shown in the wiring schematic of FIG. 2. One embodiment of the present invention has a grid of 312 points (26 rows×12 columns). Another embodiment has a grid of 228 points (19 rows×12 columns). A number of other configurations are possible in other embodiments to accommodate various uses of the apparatus.

Figure 4A:
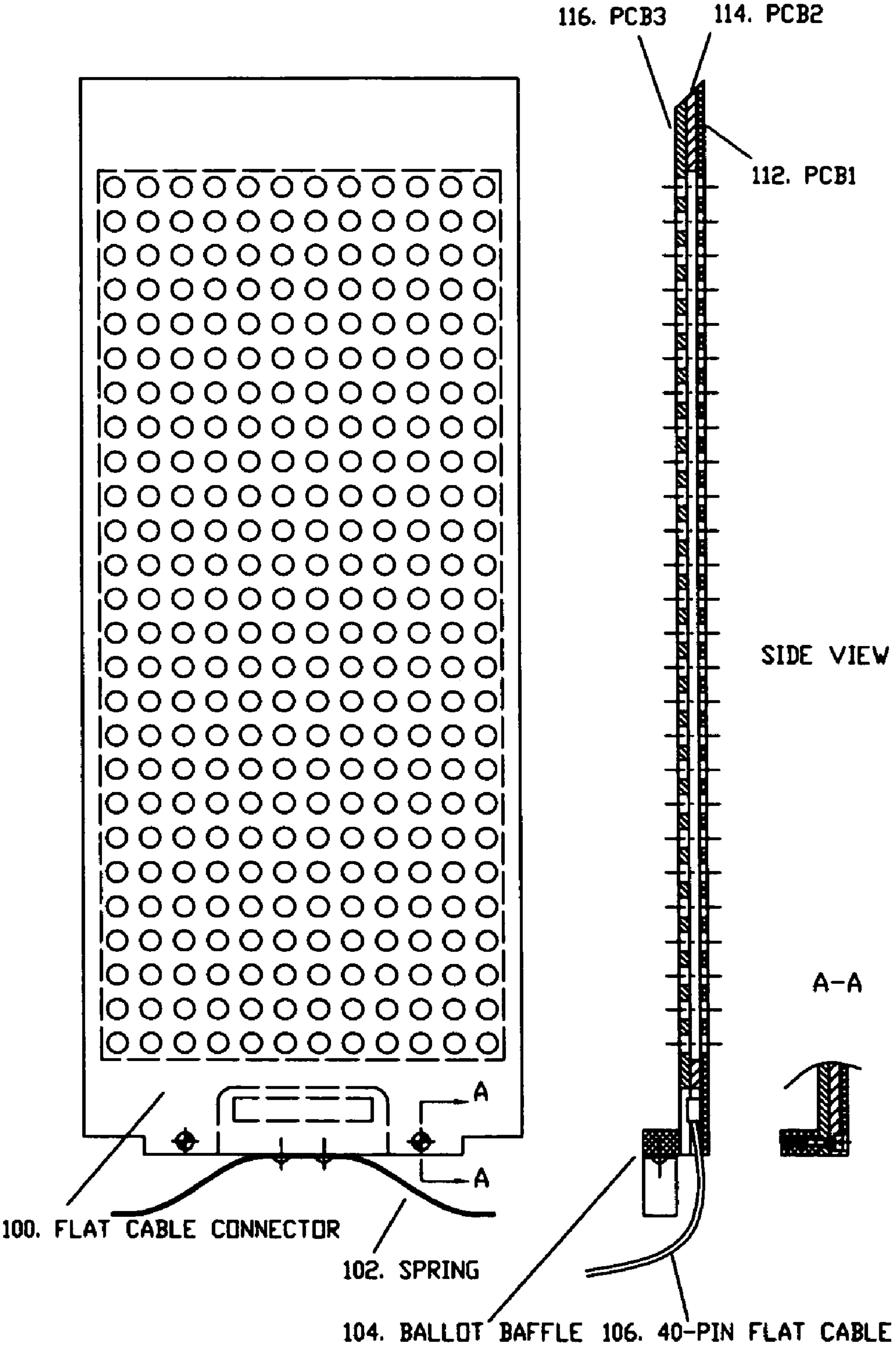
FIG. 4A is a diagram of the input board seen from the top, with a side view showing its three layers according to an embodiment of the present invention.

FIG. 4A offers two views of the surface of the input board with the associated electrical connections. The top view includes flat cable connector 100 and spring 102. To relate the orientation back to FIG. 3, a ballot is inserted from the top of FIG. 4 (top view) down toward the bottom of the page underneath the depicted input board surface. The side view depicts a slanted end surface up top, allowing the ballot to slide in diagonally through a slot. The side view also shows ballot baffle 104, which holds the ballot in place and prevents it from moving out of alignment during the voting process. In one embodiment, three PCB (printed circuit board) layers are used for input board, as shown in layers 112, 114, and 116. A 40-pin flat cable is used in one embodiment to connect the input board to SBC 24. Those skilled in the art can appreciate that any number of input board configurations can be made without departing from the scope and spirit of the invention. Each input point connects to vertical rows and horizontal lines by two diodes or other sensors. Each row and line connects resistors through the input buffer to link to SBC 24. The ballot and the input point grid of the input board can accommodate either cumulative or ranked choice voting.

When electronic probe 12 is inserted into an input point and creates contact with it, the electrical potential of the input point is lowered. This sends a signal to SBC 24. SBC 24 then computes the electrical potential from all the input points and finds the point with lowest potential. Through this mechanism the voter's choice is registered and can be reflected back to the voter on display 30 or via voice through earpiece 32. Alternatively, each input point of the input board can be equipped with an optical sensor so that once the tip of the probe is inserted into the input point, the display of the candidate information is triggered. Display 30 is a Liquid Crystal Display (LCD) in one embodiment, while equivalents such as computer monitors or televisions can be easily substituted in alternate embodiments. Using this mechanism, a voter can insert the probe into an input point and see and hear what candidate, or proposition, is correlated to that input point. The voter can thus put the probe over several input points and comprehend the choices before casting the vote. In the alternate embodiment with each input point being an optical sensor, the probe's presence at each sensor would trigger display of the choice on display 30 and announcement of the choice via earpiece 32.

In an alternate embodiment, the invention comprises of an input board adapted to detect input of a normal pen. No probe is required in this embodiment. Instead, the input points on the input board contain sensors to detect the presence of the pen and record the votes cast. The user can mark the ballot on the input board and the voting apparatus will electronically record the votes. If a user attempts an overvote, the apparatus will display visual and audible warning. Any overvote will be blocked from being registered electronically by the programming. The overvote will be recorded so that it can be deducted from the vote total, ensuring the electronic vote and the ballot card vote remain equal.

Figure 4B:
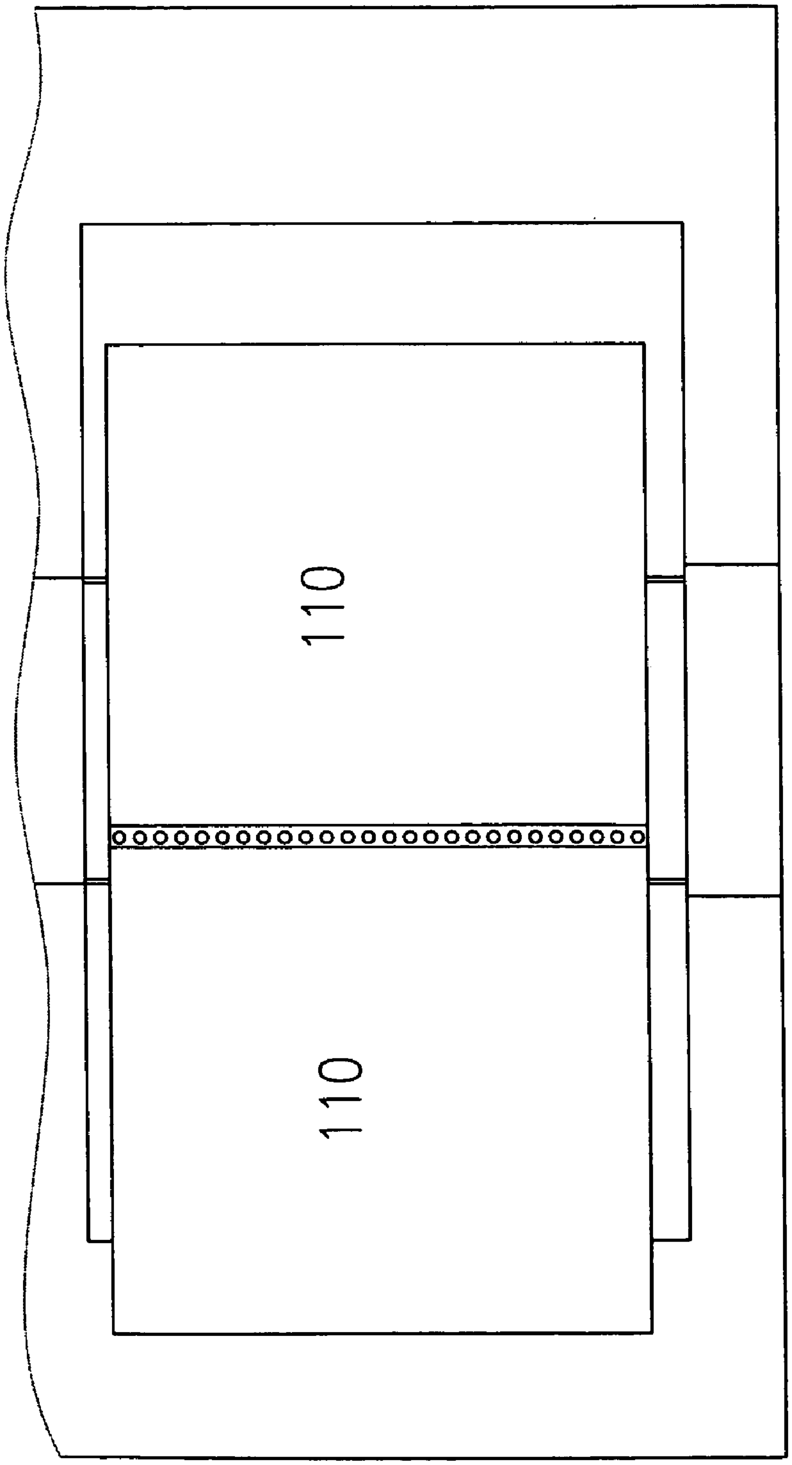
FIG. 4B is a diagram showing the input board with the election information leaflet attached.

In one embodiment, leaflets are attached next to the columns of input points in a manner similar to the ink-based voting system such as the VOTOMATIC. The leaflets contain printed candidate information, numbers, and corresponding arrows pointing to the corresponding input points, as shown in FIG. 4B. The leaflets are arranged in such a way that they cover all the input points except for one column. The two leaflets that are opened (i.e. printed information facing up) have candidate names, numbers, and arrows that point to the open column of input points. The voter can refer to the information on the leaflets to make choices. Once the voter is done with this column of input points, the voter flips the right opened leaflet to the left to reveal the next leaflet, thus exposing the next column to the right of the current column. The voter then consults the second set of leaflets that are opened to vote on choices in this input column. Thus a voter can go through all the choices by voting on choices in each column from right to left, one column at a time. This is a process similar to the one used in many existing voting systems.

Traditionally the ballot pages are printed for every election, since information is different for every election. One advantage of the present invention allows for the permanent leaflets to be used. Such leaflets can be printed with only numbers and arrows, and voters can use the probe to see the choices on display. For example, candidate "#1—John Doe, #2—Jane Doe" can be displayed on screen so that leaflets would only have to be printed with numbers. The user can correlate the names on screen to the numbers on the leaflets and thus the input points. The use of permanent leaflets eliminates the need of reprinting and reinstalling and greatly reduces the costs associated with each election.

The overall voting apparatus is designed to be portable, and can be powered by a 12-volt battery source such as cigarette lighter source in an automobile. A back-up power source is used in one embodiment. Other equivalent power sources such as 110-volt source is used in other embodiments.

Finally, an embodiment of the present invention allows for manual override in case of power or system failure. In such case, the voter can use a regular pen to mark a ballot inserted into the input board in the same manner as one used in a regular ink-based system.

Electronic Probe

Figure 5:
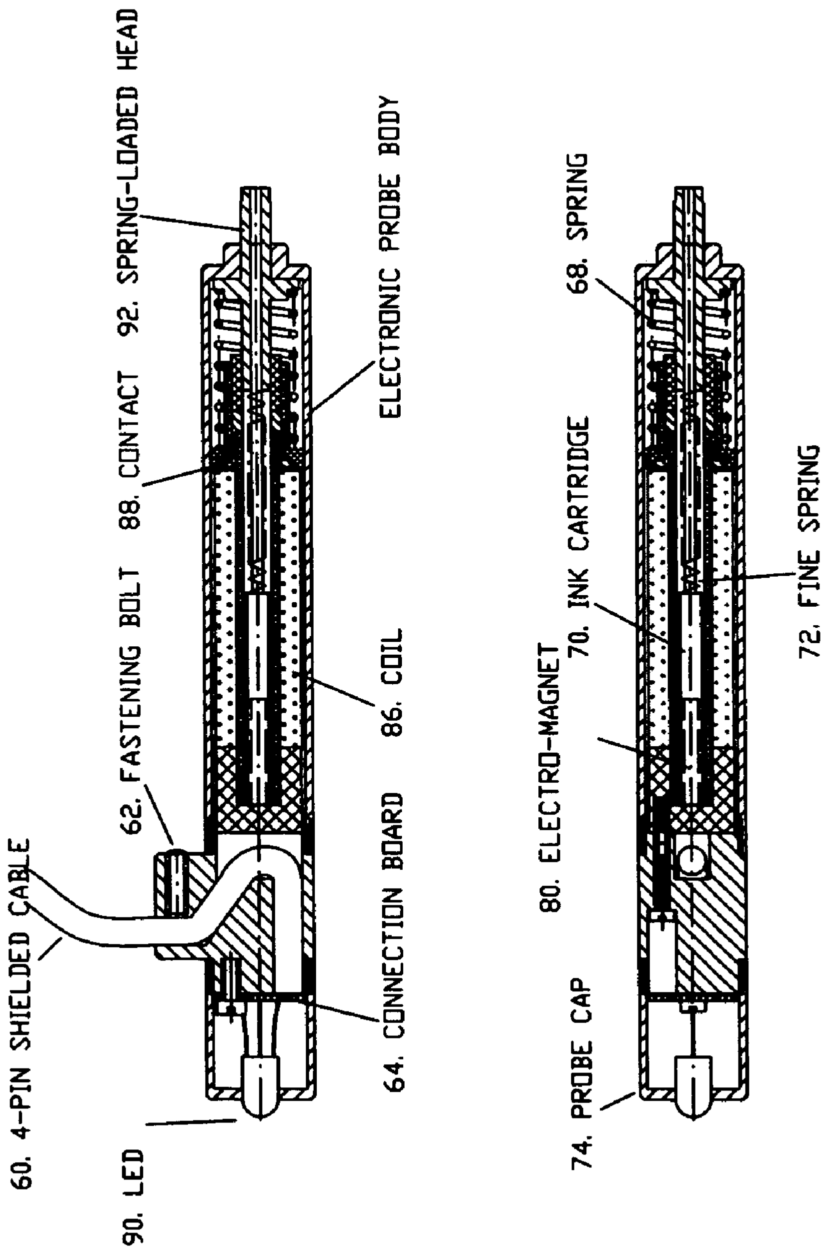
FIG. 5 shows a cross-sectional view of the electronic probe of the present invention.

FIG. 5 offers a cross-sectional view of the electronic probe of the present invention. The point of the electronic probe is a conduct electric metal tube connected by a cable 60 to SBC 24, which provides current to the probe. The tip of the probe provides ground potential, which allows for SBC 24 to detect at which input point the contact is currently making contact. Fastening bolt 62 fastens cable 60 in place inside the probe. In one embodiment, the cable is a 4-pin shielded cable that transfers electricity to the probe and facilitates data exchange between the probe and the SBC. Inside the pen is connection board 64, which is operationally connected to cable 60. An ink cartridge 70 is in the center of the point of the probe and is held and controlled by internal fine spring mechanical system 72. Spring mechanism 68 and spring loaded head 92 provides a way by which selection can be made with the probe.

When the probe is inserted into an input point on input board 16, the voter is notified of the selection either via information on screen 30 or audibly via the earphone 32. This aids the voter to determine the choices before casting an actual vote. LED 90 lights up green to show that the choice is not an overvote and the voter may proceed.

Once a voter decides on a vote and sufficiently depresses the probe into a particular input point on input board 16, the probe lowers the electric potential of a selected input point on input board 16, which is connected to SBC 24. This action registers the coordinate of the selected input point. More specifically, when the voter depresses the probe into a selected input point, spring-loaded head 94 comes inward and creates contact with contact 88. The contact thus enables the metal tip of the probe to cause a short circuit at the selected input point. SBC 24 then finds the point with the lowest electric potential and registers that a vote is being cast. If it is not an overvote, a current is sent to electromagnet 80 to release ink in ink cartridge 70 to make a mark on the ballot card, which sits underneath the input board surface. The vote is also displayed on display 30 or spoken through earphone 32.

Otherwise, if an overvote is indicated, LED 90 will turn red to warn the voter. A current will be sent to electromagnet 80, creating a magnetism that holds ink cartridge 70 in place. This prevents any ink from being released. No overvote will be registered by the SBC. Also, if a voter tries to proceed without voting on all items in a given section, LED 90 will also flash red and block voting until the voter registers an intention to undervote. This assures an accurate count of undervotes.

Preventing Unintentional Undervotes

Every election section provides an opportunity to vote on one or more choices. If so desired, after each section, the voter can indicate a desire to abstain from one or more votes. In the present invention, a voter cannot proceed to the next voting section or remove the ballot card from the election box unit until he/she registers the decision to abstain on the current selection. The machine will keep a record of the number of votes from which the voter has abstained. Also, in one embodiment, a warning is displayed on-screen in the event of an undervote.

Preventing Overvotes

The electromagnetism in the input pen will not allow overvoting. After the voter has made the correct number of votes, the probe will block for any further voting on the given section. Also, in one embodiment, buzzer 36 provides warning of attempted overvote, along with an on-screen warning on display 30.

Voter Verified Printout

As shown in FIG. 1, an optional printer unit 26 can be operationally connected to computing unit 10 in one embodiment. In one embodiment, a thermal paper printer or equivalent prints the votes cast by the current voter. The printer is contained in a locked box and shows the voter his/her votes through a small window. Thus the voter can see the votes he/she has cast printed on paper before leaving. In one embodiment, when a vote is cast it appears on the right part of the display. The vote is also printed by the printer on a piece of paper containing a running list of votes so that the voter can see what votes have been cast on the printer. When the voter is satisfied with the record and confirms his/her votes, the printer resets for the next voter by moving ahead to show blank paper in the small window. The printout serves as an additional record of votes on the corresponding machine.

Voting Interface

The voter can use the familiar paper-based voting instructions for operating the voting apparatus of the present invention, since the voting interface is familiar to the many pen-and-ink based voting systems in existence. In addition to the printed instructions, LCD Display 30 displays the voting instructions and voter's choices. When the probe is partially inserted into an input, the number of the input and the item to be voted on is identified both on screen and by voice via ear piece 32. When the probe is fully depressed, the vote is recorded and added to the list of the voter's choices. In alternate embodiments, the voter can also vote by using only voice cues. In other embodiments, the voters can vote without printed instructions.

Tampering Prevention

In one embodiment of the present invention, there are three mechanical locks operated by keys to prevent tampering. These locks are locked at the voting headquarters before the voting apparatus are delivered to the polling places. In one embodiment, the locks are monitored by electronic sensors that record any unwanted intrusion. In one embodiment, one lock locks the IC card (which records the results), one locks the optical disc drive (which contains election information to be displayed on screen) and one locks the printer. The IC card and optical disc and printer can be locked at the headquarters before the voting apparatus are delivered to the local polling places. Also, because the on-board SBC contains a simple and limited computer program, the risk of it being re-programmed to alter votes is low. Even if re-programming is performed, any changes can be easily detected by cross-checking the actual ballots.

Possibilities of electronic tampering are further prevented by using a password code for communication between IC card and computing unit and between recorded media and computing unit. The password code ensures the IC card and recorded media cannot be changed or altered. Also the present invention provides no means of input into the individual unit (other than the probe) and allows no interconnectivity between machines.

Access for the Visually-Impaired and Multi-Language Voting

Ear piece 32 provides an audible interface to assist a visually-impaired voter in using the present invention. Voice instruction and verification are transmitted audibly to the voter via ear piece 32 and will guide the voter through the voting process step by step. Furthermore, an embodiment of the present invention allows for programming of voice instruction in multiple languages. In one embodiment, English is the default language and the voter can switch into another language by using language switchover key 128. Also, the voter can select a language using a language selection key 42. These options eliminate the need for purchasing additional voting equipments for the visually impaired or foreign-language voters.

Storage and Delivery of Information

Election information (e.g. candidate listing) is input by CD-ROM or other equivalent optical disc drive 40 connected to main unit CPU 10. The election information is to be supplied by the election officials at the time of installing the election information sheets. The IC card in IC card drive 22 stores the actual vote results.

Power

In one embodiment, one battery is used for machine memory and one battery is used for backup in the event of a power failure. It can be appreciated that a number of power sources can be used to provide power supply in the present invention.

Method of Operation

In one embodiment, the following steps are taken to operate the voting apparatus of the present invention:

1. At the appropriate level, decide on languages to be used for the election.
2. Prepare printed election ballot pages in English and the alternate languages.
3. Program ballot (election) information and voting instructions in the chosen languages onto optical disc 40 (e.g. CD-Rom or DVD).
4. Record and program voice instructions onto optical disc in the chosen languages.
5. Program identification codes onto IC card and optical disc.
6. Install election information leaflets onto input board.
7. Turn power on.
8. Open the locks and covers, insert IC card in IC card drive 22 and optical disc into CD-ROM 40, press "read" key. The voting apparatus will verify password codes and serial numbers on the IC card and the optical disc.

After these steps are performed, in one embodiment of the present invention the voting apparatus will read the IC card and verify the password codes. The voting apparatus will check the optical disc to see that it matches the password codes. The voting apparatus will check all systems automatically and indicate that it is ready.

In one embodiment, the election information (e.g. candidate names, etc.) can be programmed into the apparatus by way of filling out a programming sheet similar to a Scantron sheet and fed into scanner. The election information can thus be programmed into the voting apparatus without requiring workers to g through a complex computer programming process.

After these steps the poll workers can lock the voting apparatus for delivery to polling locations. After the voting apparatus has been delivered to local polling stations, local poll workers will set up the voting apparatus and turn them on.

The voters follow these steps of operation:

1. Voter receives the ballot card from poll worker and proceeds to voting booth.
2. Voter inserts ballot into voting apparatus, in accustomed manner.
3. Voter selects desired language by pressing "language" key (switch 42).

Voter can switch between the default language, English, and an alternate language. When the voter has chosen an alternate language, both the written and voice instructions will be in that language, if that language has been provided by the voting headquarters.

When the voter first uses the electronic probe to vote, the ballot lock (46) will be activated. When the voter finishes voting on the all election subjects and verifies his final selection, the ballot card lock will open and the ballot card can be taken out.

If the voter makes a mistake or wishes to change a vote, he must press the '"NO" Input' at the end of the ballot. The voter can then take out the ballot card and request a new ballot. The previous ballot will be cancelled by the machine, and no vote will be recorded. The poll worker must invalidate the ballot that the voter has removed.

Local polling workers follow these steps of operation:

1. After the election has been completed, poll workers will unlock and open the machine cover and take out the IC card, which contains a complete record of the votes and undervotes for that machine. Authorized poll workers who know the password code can then read the results with card readers. The ballot cards should be collected and identified by the number of the machine from which they come. They must be preserved in case they are needed for recounting by optical scanner or by hand.
2. Vote totals can be derived from the IC card (also known as SMARTCARD) records, the ballot card counting and the printer records. These totals can be cross-checked against each other.

Thus, a voting apparatus and method of use are described in conjunction with one or more specific embodiments. The invention is defined by the claims and their full scope of equivalents.

We claim:

1. A voting apparatus, comprising:

a computing unit;

an election box unit, comprising an input board adapted to receive a ballot; and an electronic probe adapted to create an ink mark of a vote on said ballot and cause said input board to electrically indicate said vote to said computing unit for vote tabulation, wherein said electronic probe further comprises:

an ink ejection coil unit;

an electrical means for transmitting an electrical signal to said election box unit; and an electromagnetic ink-regulation means for preventing invalid votes by regulating release of ink from said ink ejection coil unit to ensure valid vote marks on said ballot.

2. The apparatus of claim 1 wherein said electrical signal is transmitted when said electronic probe is inserted into an input point on said input board, said signal causing display of election information correlated to said input point.

3. The apparatus of claim 1 wherein said ink mark is created when said electronic probe is depressed into an input point on said input board.

4. The apparatus of claim 3 wherein said ink mark is created when said input point does not correspond to an overvote.

5. The apparatus of claim 3 wherein an electrical signal is transmitted to indicate a vote when said electronic probe is depressed into an input point on said input board.

6. The apparatus of claim 5 wherein said electrical signal is transmitted when said input point does not correspond to an overvote.

7. The apparatus of claim 1 wherein said ink ejection coil unit further comprises:

a spring-loaded head;

a contact;

an electromagnet;

an ink cartridge magnetically held in place by said electro-magnet, whereby when said electronic probe is depressed into a valid input point on said input board, said electro-magnet releases its magnetic hold on said ink cartridge to release ink in said ink cartridge.

8. The apparatus of claim 7 wherein said spring-loaded head is adapted to come into contact with said contact to cause said electromagnet to release said ink cartridge when said electronic probe is depressed into a valid input point.

9. The apparatus of claim 7 wherein said electromagnet maintains its magnetic hold on said ink cartridge when said electronic probe is depressed into an input point that corresponds to an overvote.

10. The apparatus of claim 1 wherein said election box unit further comprises:

a single board computer.

11. The apparatus of claim 1 wherein said election box unit further comprises:

a ballot lock; and a security door switch.

12. The apparatus of claim 11 wherein said ballot is secured by said ballot lock during voting and released from said ballot lock when voting is finished.

13. The apparatus of claim 12 wherein said ballot is secured after said probe is lifted from its holder.

14. The apparatus of claim 1 wherein said input board comprises a gird of input points electrically connected to said computing unit.

15. The apparatus of claim 1 wherein said computing unit comprises a computer processor;

a display;

an audio headphone;

a media drive adapted to read media disc recording containing election information.

16. The apparatus of claim 15 wherein said media drive is protected by a security key to prevent unauthorized reading of data.

17. The apparatus of claim 1 wherein said computing unit further comprises:

a language selection key for selecting the language to be used during voting.

18. The apparatus of claim 1 wherein said election box further comprises:

an IC card drive adapted to record election results in an IC card; and a printer for printing a paper record of votes.

19. The apparatus of claim 18 wherein said IC card is protected by a security key to prevent unauthorized writing of data to said IC card.

20. The apparatus of claim 1 wherein said election box further comprises:

a keypad input.

21. The apparatus of claim 1 wherein said input board comprises a plurality of input points.

22. The apparatus of claim 21 wherein said input points are arranged in a gird, wherein each input point connects to vertical rows and horizontal lines by two diodes or other sensors.

23. The apparatus of claim 22 wherein each of said input points is an optical sensor adapted to detect the presence of said electronic probe at said input point.

24. A voting apparatus, comprising:

an input board adapted to receive a ballot; and an electronic probe adapted to electronically indicate a vote and create an ink mark of said vote on said ballot, whereby said indication is captured for vote tabulation, wherein said electronic probe further comprises:

an ink ejection coil unit;

an electrical means for transmitting an electrical signal to said election box unit; and an electromagnetic ink-regulation means for preventing invalid votes by regulating release of ink from said ink ejection coil unit to ensure valid vote marks on said ballot.

25. The apparatus of claim 24 whereby said electronic probe indicates a vote by transmitting an electrical signal.

26. The apparatus of claim 25 wherein said electronic probe further comprises:

an ink ejection coil unit.

27. The apparatus of claim 25 wherein said electrical signal is generated when said electronic probe is inserted into a valid input point on said input board.

28. The apparatus of claim 24 wherein said input board comprises a plurality of input points.

29. The apparatus of claim 28 wherein said input points are arranged in a gird, wherein each input point connects to vertical rows and horizontal lines by two diodes or other sensors.

30. The apparatus of claim 28 wherein each of said input points is an optical sensor adapted to detect the presence of said electronic probe at said input point.

31. The apparatus of claim 24 wherein said ink mark is created when said electronic probe is depressed into a valid input point on said input board.

32. The apparatus of claim 24 wherein said ink ejection coil unit further comprises:

a spring-loaded head;

a contact;

an electromagnet;

an ink cartridge magnetically held in place by said electromagnet, whereby when said electronic probe is depressed into a valid input point on said input board, a current is directed at said electromagnet to release its magnetic hold on said ink cartridge to release ink in said ink cartridge;

an electrical means for generating said electrical signal.

33. A voting apparatus, comprising:

an input board adapted to receive a ballot; and an electronic probe adapted to indicate a vote and create an ink mark of said vote on said ballot, whereby said indication is captured for vote tabulation; wherein said ink ejection coil unit further comprises:

a spring-loaded head;

a contact;

an electro-magnet;

an ink cartridge magnetically held in place by said electromagnet, whereby when said electronic probe is depressed into a valid input point on said input board, a current is directed at said electromagnet to release its magnetic hold on said ink cartridge to release ink in said ink cartridge;

an electrical means for generating said electrical signal;

wherein said electromagnet maintains its magnetic hold on said ink cartridge when said electronic probe is depressed into an input point that corresponds to an overvote.

* * * * *

UNITED STATES PATENT AND TRADEMARK OFFICE

CERTIFICATE OF CORRECTION

PATENT NO. : 7,007,842 B2 Page 1 of 1
APPLICATION NO. : 10/983466
DATED : March 7, 2006
INVENTOR(S) : Richard Hawkins and Ping Shao It is certified that error appears in the above-identified patent and that said Letters Patent is hereby corrected as shown below:

Item [57]
In the Abstract, line 15, replace “build-in” with --built-in--

Claim 24, insert --an election box unit;-- after “comprising” on line 54 of col. 11.

Claim 33, insert --an ink ejection coil unit;-- after comprising” on line 40 of col. 12.

Signed and Sealed this

Twenty-fifth Day of September, 2007

JON W. DUDAS
*Director of the United States Patent and Trademark Office*